(12) United States Patent
Haller et al.

(10) Patent No.: US 7,587,608 B2
(45) Date of Patent: Sep. 8, 2009

(54) METHOD AND APPARATUS FOR STORING DATA ON THE APPLICATION LAYER IN MOBILE DEVICES

(75) Inventors: Jochen Haller, Karlsruhe (DE); Luciana Moreira Sá de Souza, Karlsruhe (DE)

(73) Assignee: SAP AG, Walldorf (DE)

( * ) Notice: Subject to any disclaimer, the term of this patent is extended or adjusted under 35 U.S.C. 154(b) by 787 days.

(21) Appl. No.: 11/001,147

(22) Filed: Nov. 30, 2004

(65) Prior Publication Data
US 2006/0129830 A1  Jun. 15, 2006

(51) Int. Cl.
*G06F 21/00* (2006.01)
(52) U.S. Cl. ...................... 713/182; 380/270
(58) Field of Classification Search ............... 713/183, 713/186, 182; 726/2, 16; 380/270
See application file for complete search history.

(56) References Cited

U.S. PATENT DOCUMENTS

| 6,947,556 | B1 * | 9/2005 | Matyas et al. ............... 380/29 |
| 6,971,005 | B1 * | 11/2005 | Henry et al. ............... 713/155 |
| 7,222,101 | B2 * | 5/2007 | Bishop et al. ............... 705/51 |
| 2005/0044375 | A1 * | 2/2005 | Paatero et al. ............... 713/176 |

* cited by examiner

*Primary Examiner*—Ellen Tran (57) ABSTRACT

The present embodiments provide a system and methods for encrypting and storing data in a mobile device such as a personal digital assistant. The system includes an access controller and a cryptography manager both coupled to the software applications on the mobile device. The system employs a user specific key to encrypt the user specific data. The encrypted file along with header information is stored below the application layer within the mobile system.

20 Claims, 8 Drawing Sheets

METHOD AND APPARATUS FOR STORING DATA ON THE APPLICATION LAYER IN MOBILE DEVICES

CROSS-REFERENCE TO RELATED APPLICATION

None

TECHNICAL FIELD

The present invention relates to mobile devices, and more particularly to systems and methods for encrypting and storing data within a mobile device.

BACKGROUND

With the advent of personal computers in the mid to late 70's, the use of computers for home and office has dramatically increased. As a result of the rapid development of technology, the size of the computer has also been greatly reduced. A variety of advanced notebook computers as well as hand-held devices have been developed. The application of computers greatly improves working efficiency, and shortens the distance between people. Regular hand-held devices are designed for particular purposes. However, due to certain limitations in technology, these hand-held devices typically cannot replace personal computers.

Therefore, these hand-held devices are commonly used in certain conditions to store and process certain types of data. As an example, a handheld device may be used in a warehouse to track movement of goods in, out and within the warehouse. For long-term preservation of the information being stored in a hand-held device or for a complicated analysis of the information, communication technology may be employed to transmit the information from the hand-held device to a personal computer, server computer, or other networked machine. At the present time, a variety of communication networks have been used for the transmission of information from a distance. It is important to efficiently utilize obtained information, and to well protect it.

Conventionally, a user may protect one's private information in a computer system by setting a code in it, or encrypting one's private information by means of the application of an encryption procedure. If a user owns a hand-held device and a personal computer, the user may need to set a code in the hand-held device and the personal computer separately, or to use an encryption procedure in encrypting the information in the hand-held device and the information in the personal computer. This method is complicated, and its effect is still not guaranteed. The code set in a computer system can be easily broken. To a computer hacker, it may be easy to break a password set in a computer system by means of employing code-breaking procedures or tracing the password.

Other problems with storing data on mobile devices are due to data corruption and theft. Typically a single user interacts with the mobile device so there is no multi-user operating system which requires some type of security measures or a password. Therefore data is extremely accessible and vulnerable. Also conventional forms of data encryption such as symmetric encryption are found to be too CPU intensive for a hand-held device.

Data encryption for PDA or handheld devices (personal devices) is presently limited by a variety of factors. Resources such as processors and memory may be limited on a personal device. As a result, encryption can be either time-consuming (reducing efficiency) or ineffective. Similarly, encryption facilities tend to be limited—for example operating systems for personal devices typically have limited or no encryption facilities. Operating systems may provide a logon password used to allow the device to power-on or for initial operation of the device, but may not provide the ability for multiple users to access some data universally and reserve other data as segregated, encrypted data.

Therefore the conventional data encryption and storage techniques within a mobile computer system have severe limitations and a more appropriate solution is sought that offers both high security and efficient encoding and decoding of data. Preferably, capabilities beyond those outlined above would be provided, allowing for access to some data by all users and private access to data by specified users. Moreover, such capabilities would preferably be offered in a manner allowing for integration with present software (such as operating systems) and future software used on personal devices. Additionally, allowing for retrieval of information in unusual circumstances where a device is stolen or a user is unable or unwilling to provide access to the device normally may be useful.

SUMMARY

Various embodiments of the present invention provide systems and methods that allow for safe and efficient data encryption and storage on a mobile device. The system may be designed and implemented to be platform independent by using Java technology, for example. This technology supports various mobile business applications and offline capabilities that only require intermittent connections to backend systems, and offer functional public interfaces for applications. Moreover, parts of the system may be platform independent, while other parts of the system (such as specific applications for example) may be platform dependent and capable of integration with platform independent portions of the system.

In an embodiment of the present system the mobile device system contains a processor, a memory for storing applications and data files, an access controller and a cryptography manager. The system functions to provide both security and encryption of data using an encryption key which may be produced from a user's ID number and password, for example.

Another embodiment provides a method for operating a mobile device that includes the receiving a request to operate a personal device, requesting a first user identifier responsive to the request to operate, comparing the first user identifier to a set of stored user identifiers, and operating the personal device with user-specific data corresponding to the first user identifier.

In still another embodiment, a method is provided, including receiving a request to operate a personal digital assistant, requesting a user identifier responsive to the request to operate, comparing the user identifier to a set of stored user identifiers, operating the personal device with user-specific data corresponding to the user identifier, encrypting user-specific data with a user-specific key, storing user-specific data as encrypted data, synchronizing user-specific data with a remote database, and terminating operation of the personal digital assistant responsive to a logoff request.

It will be appreciated that the present invention is described below using specific examples that are not intended to limit the invention. The systems and methodology may be applied to a broad range of other computer applications. Therefore these and other advantages and aspects of the present invention will become apparent to those skilled in the art upon a reading of the following detailed description and a study of the drawing figures.

BRIEF DESCRIPTION OF THE DRAWINGS

The present invention is illustrated in an exemplary manner by the accompanying drawings. The drawings should be understood as exemplary rather than limiting, as the scope of the invention is defined by the claims.

DETAILED DESCRIPTION

Various exemplary embodiments of the mobile data encryption system and methods are described below with reference to FIGS. 1-8. Various embodiments of the present invention provide systems and methods that allow for safe and efficient data encryption and storage on a mobile device. The system may be designed and implemented to be platform independent by using Java technology, for example. This technology supports various mobile business applications and offline capabilities that only require intermittent connections to backend systems, and offer functional public interfaces for applications. Moreover, parts of the system may be platform independent, while other parts of the system (such as specific applications for example) may be platform dependent and capable of integration with platform independent portions of the system.

In an embodiment of the present system the mobile device system contains a processor, a memory for storing applications and data files, an access controller and a cryptography manager. The system functions to provide both security and encryption of data using an encryption key which may be produced from a user's ID number and password, for example.

In another embodiment, a method is provided, including receiving a request to operate an application of a personal device and requesting a first user identifier responsive to the request to operate. The method further includes comparing the first user identifier to a set of stored user identifiers. The method also includes operating the application of the personal device with user-specific data corresponding to the first user identifier.

In various embodiments, the method may further include storing user-specific data as encrypted data. In some embodiments, the method is operated on a personal digital assistant. In some embodiments, the user identifier is a user ID number and password. In other embodiments, the user identifier is a user specific key. The method, in some embodiments, may include encrypting data with a user-specific key. Moreover, in some embodiments, the method includes synchronizing data with a server. Additionally, in some embodiments, the method further includes storing a header file with the encrypted data. Also, in some embodiments, the method includes requesting a second user identifier and encrypting data occurs using symmetric encryption methods.

In yet another embodiment, the invention is an apparatus. The apparatus is a remote personal device. The remote personal device includes an access controller. The remote personal device also includes a cryptography manager. The remote personal device further includes an application coupled to the access manager and the cryptography manager. The application queries the access cotnroller for an indication of permission to execute, and may interact with the cryptography manager to store personal data. The device may also include an operating system. The device may also include a processor. Moreover, the device may include a file system manager. Additionally, the device may include a user interface and a network interface. Alternatively, the device may include means for interacting with a user. In some embodiments, the apparatus may be a system which further includes a network server.

Another embodiment provides a method for operating a mobile device that includes receiving a request to operate a personal device, requesting a first user identifier responsive to the request to operate, comparing the first user identifier to a set of stored user identifiers, and operating the personal device with user-specific data corresponding to the first user identifier.

In some embodiments of methods for operating personal devices, the device may be a personal digital assistant (PDA) or similar device. In some embodiments, a user identifier may include a user ID and password. Alternatively, the user identifier may be a user specific key in some embodiments. Additionally, user specific data may be stored as encrypted data and may be encrypted with a user-specific key in some embodiments. Moreover, some embodiments may include synchronizing data with a server or with a remote database in some embodiments. Furthermore, the method may include requesting a second user identifier and encrypting data may involve symmetric encryption methods. Additionally, some embodiments may include storing a header file with the encrypted data. Also, in some embodiments, the method may include deriving the user specific key at a server based on the user ID in conjunction with a key management component.

In still another embodiment, a method is provided, including receiving a request to operate a personal digital assistant, requesting a user identifier responsive to the request to operate, comparing the user identifier to a set of stored user identifiers, operating the personal device with user-specific data corresponding to the user identifier, encrypting user-specific data with a user-specific key, storing user-specific data as encrypted data, synchronizing user-specific data with a remote database, and terminating operation of the personal digital assistant responsive to a logoff request.

The method may further include using the user's ID number (or similar alphanumeric code) and password as a user identifier. The method may also include using symmetric encryption methods. The method may include using header files which are stored with encrypted data. Moreover, the method may include encrypting is performed in an application layer using key derivation techniques based on a user ID.

The various embodiments described herein are exemplary of the present invention. Features of some embodiments may be used with other embodiments, even though such features are not specifically described with respect to such embodiments. Not only may embodiments have portions or components rearranged, but many appropriate substitutions will be recognizable to those having skill in the art.

Figure 1:
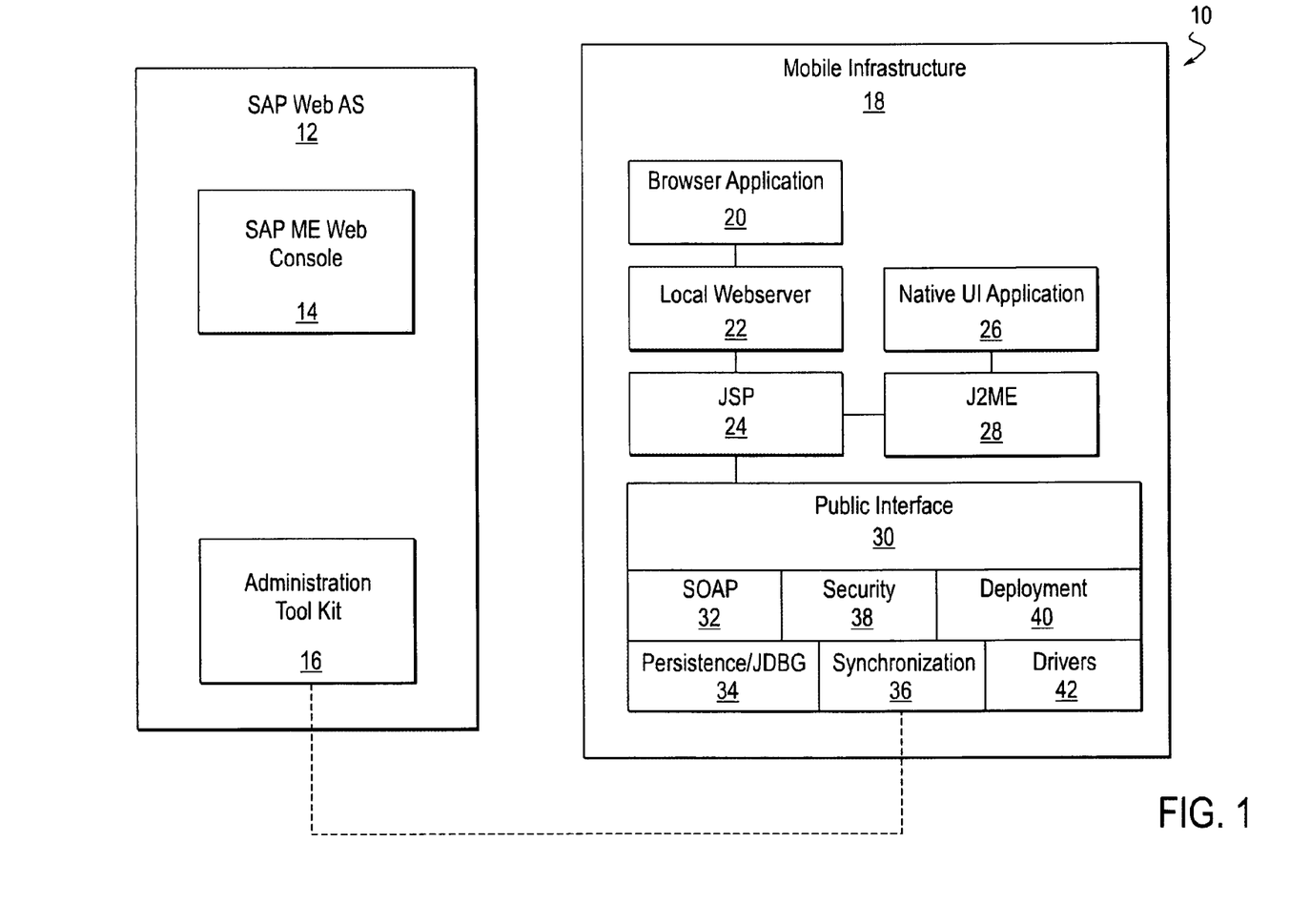
FIG. 1 illustrates an embodiment of a mobile system or infrastructure.

While the invention may be implemented in a variety of embodiments, a system is an example of one embodiment appropriate for the invention. FIG. 1 shows a diagram of a mobile system or infrastructure used in an exemplary embodiment. The system 10 contains a web application server 12 (such as an SAP Web application server for example) that contains a web console 14 and an administration toolkit 16. Contained in the system 18, are a browser application 20, a local webserver 22, a JSP 24 (a Java server program), a native user interface (UI) application 26 and a J2ME 28 (a Java to local system interface). Connected to the JSP 24 and the J2ME 28, is the public interface 30. Applications contained in the interface 30 are SOAP 32, Persistance/JDBC 34 (Java database interface), synchronization 36, security 38, deployment 40, and drivers 42. The system 10 of FIG. 1 provides an application framework with an offline focus, meaning that no permanent network connection between the mobile device and backend system exists, and no application server(s) or database is required. In a typical application setting, data is acquired and processed on the mobile device for later transmission to backend systems. Therefore this data should be protected for the time of storage on the mobile device using the subsequent embodiments.

The system or framework 10 in FIG. 1 is designed and implemented to be platform independent by using Java technology. This technology supports various mobile business applications at its top-end. These applications are typically offline capable, only requiring intermittent connections to backend systems. This technology offers functional public interfaces for applications. Mobile applications like the Mobile Asset Management (MAM) are used on the mobile device, e.g. a PocketPC based Personal Digital Assistant (PDA). Data to be encrypted and stored may be generated from customer orders, for example, and ultimately should be transferred to a backend application server 12 (Web AS or WAS). A permanent network connection between both the WAS and mobile device is not required. The system 10 makes use of the public interfaces 30 to cope with the problem of an intermittent network connection.

Via the persistence interface 34, the data is logically stored in the file system for later transmission to the WAS. In some embodiments, the user must explicitly trigger a sync operation when a network connection is available to transfer the data as will be subsequently described. The present system protects persistent data against the two following high risk/high impact threats: theft of the device, and tampering/false data injection of persisted data by a third party or another valid user. For this reason, the "Secure Storage" implementation architecturally is placed beneath the persistence layer 34. This system may be used without regard to a specific underlying operating system or hardware system, and thus allows for independent implementation on a range of personal devices.

Figure 2:
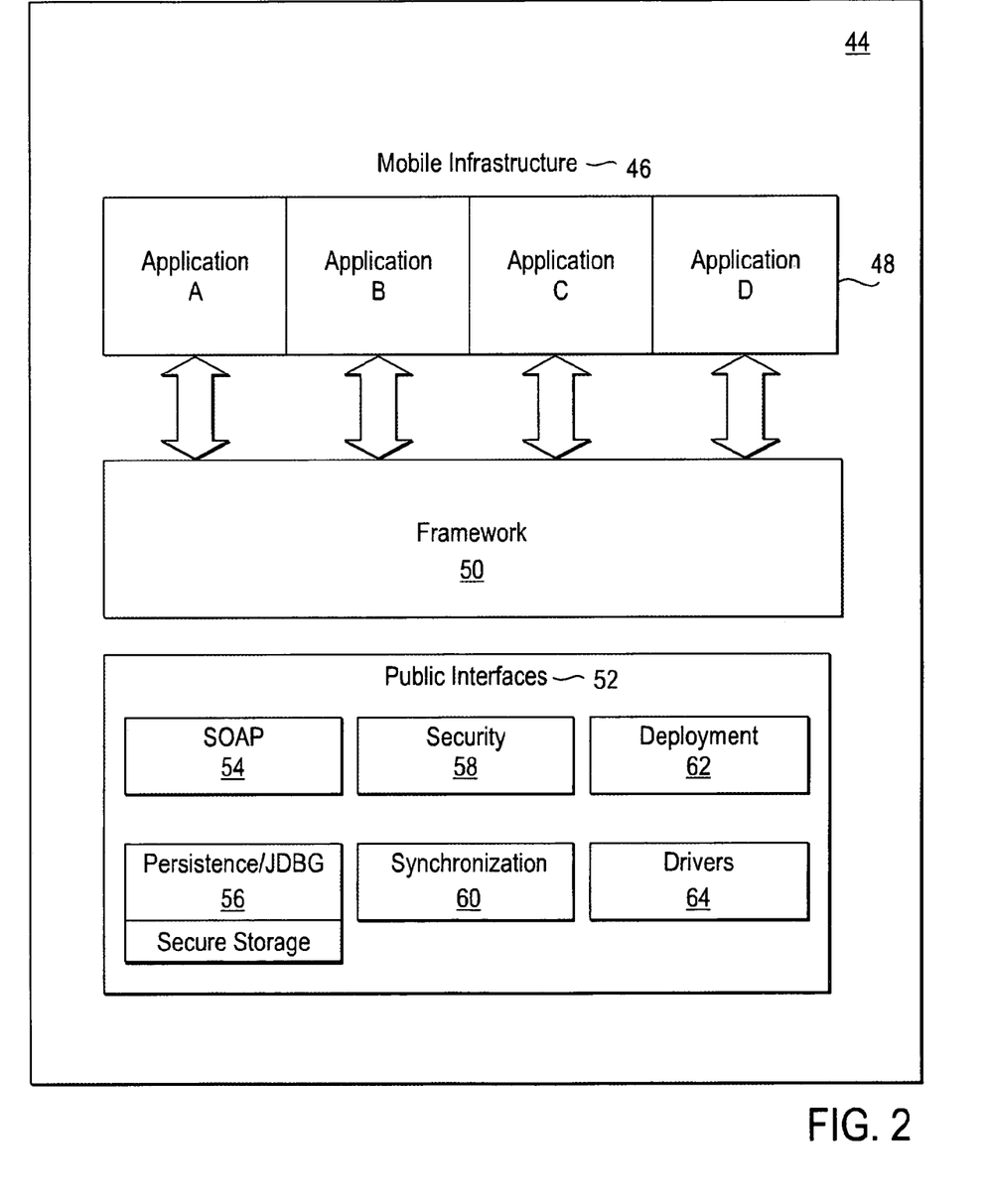
FIG. 2 illustrates another embodiment of a mobile system or infrastructure.

Other systems may be used as part of the present invention in various embodiments. FIG. 2 shows another exemplary embodiment of a mobile system 44. This exemplary embodiment contains a system 46 that includes applications A, B, C and D, 48 and a framework 50. Coupled to the system 46 is the public interface 52. Contained in the interface 52 are applications SOAP 54, Persistence/JDBC with secure storage 56, security 58, synchronization 60, deployment 62, and drivers 64. In this embodiment, the encrypted data may be created and stored beneath the persistence application layer 56, as shown in greater detail in FIG. 3. This exemplary embodiment may rely on functional components like data formats or sync mechanisms in the exemplary implementation. Only client side authentication need be used as a security prerequisite in this embodiment. Again, the embodiment described and illustrated may be implemented without concern for a specific underlying hardware or operating system technology.

Figure 3:
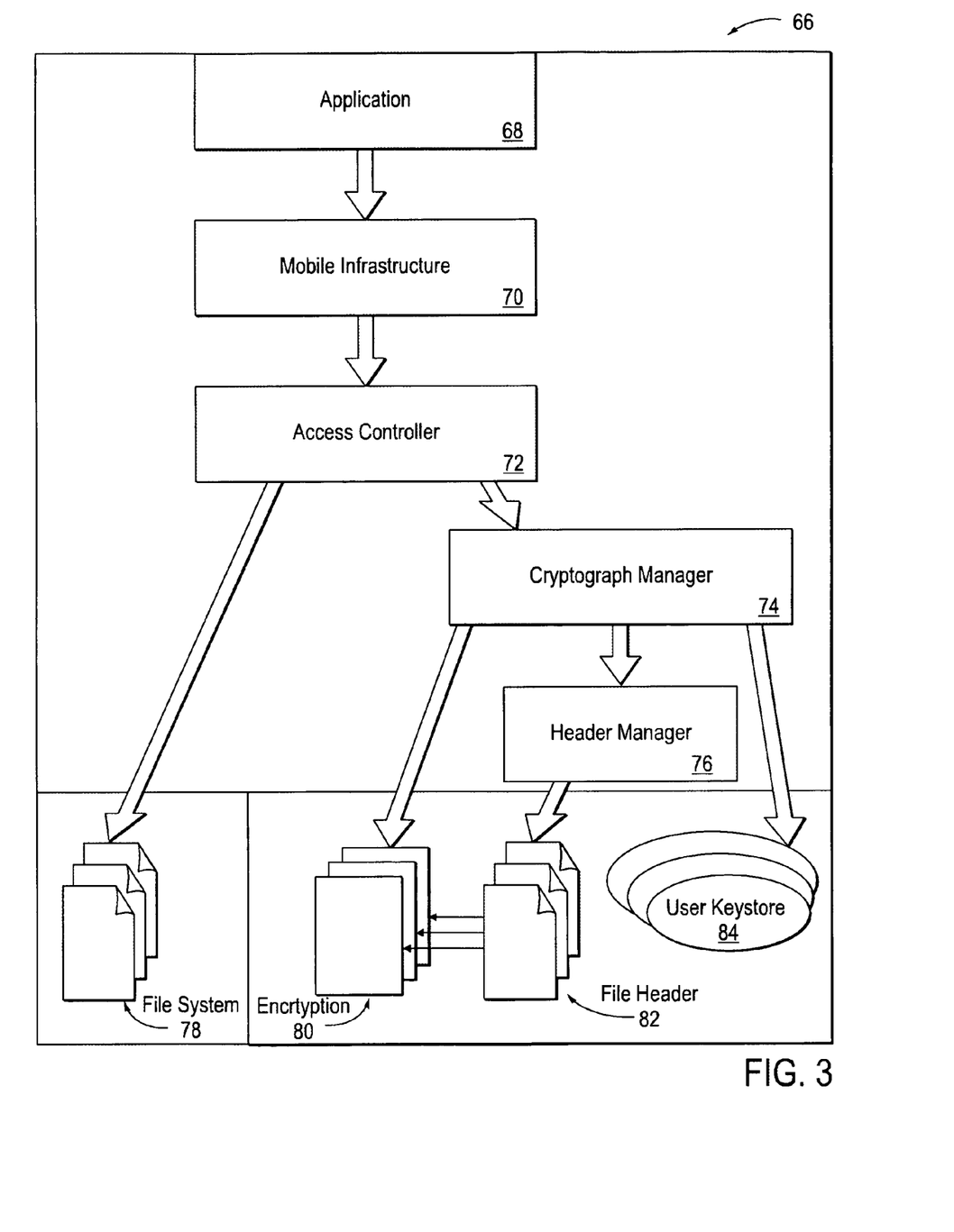
FIG. 3 illustrates the data encryption elements of an embodiment.

Various architectures may be used in conjunction with the systems of FIG. 1 and 2, and features of the embodiments of FIGS. 1 and 2 may be substituted between the embodiments or added to the various embodiments. FIG. 3 shows another exemplary embodiment of the architecture of the mobile device encryption system 66. This exemplary embodiment includes the following components, an application 68, a mobile system or infrastructure 70, an access controller 72, a cryptography manager 74, and a header manager 76. The controllers and managers are connected to the file system 78, the encrypted data files 80, header files 82 and a user's keystore 84.

There are three different types of files in this architecture 66 (in this embodiment) that can be stored on the file system through the persistence layer. These types of files are plaintext, user files, and shared files. Plaintext files are stored without any interference from the Secure Storage architecture, meaning that these files have no kind of encryption, therefore confidentiality, integrity and access control are not provided. User files and shared files are encryption protected files 80. These files are always encrypted to protect them in a way to grant confidentiality, integrity and access control. The difference between user files and shared files is who has the right to access them. Only the user who created a user file is allowed to access it, any other user who attempts to access this file may have the access denied as subsequently described.

Shared files are files that can be accessed by a pre-defined group of users, for instance all employees of a company or all members of a department. Any user who is not a part of this group may not be allowed to access these files. Another type of file is the secure random access file that allows a transparent integration of the Secure Storage architecture into the system 70 by intercepting all requests made by the Persistence Layer to the file system. According to the type of the file that is being accessed, the secure random access file decides if the application may access it directly or through the access controller 72.

The access controller 72 integrates the security logic of the system 66. Since the secure storage is located beneath the persistence layer (as shown in FIG. 2), the access controller 72 is able to intercept the requests for reading and writing persistent data on the local file system 78. Intercepting the requests allows the controller 72 to check the permission of the user to access the requested data and refuse access when the user is not allowed. If an unauthorized user tries to access the protected file directly through the file system, thereby avoiding the access controller 72 mechanisms, this user may not be able to decrypt the data because he does not have the required key.

The access controller 72 uses the user's keystore 84 to get the necessary keys for accessing the protected files. When a user logs in the MI 70, it also logs in to the access controller 72 to unlock the user's keystore 84. In the same way, when the user logs out from MI 70, he also logs out from the access controller 72 to guarantee that his keystore 84 is locked.

For generating a protected file the secure random access file passes the file's plaintext data to the access controller 72. The access controller 72 chooses the key and requests the cryptography manager 74 to encrypt the data. Finally, the access controller 72 writes the encrypted data to the file system.

The cryptography manager 74 is responsible for applying cryptographic protection to the persistent data based on static mechanisms. The manager 74 has to perform this task by taking functional requirements into account such as performance, to introduce as little overhead into application operations as possible, to maintain transparency, to support legacy applications and "switched-off" encryption. The cryptography manager 74 performs the functions of data encryption, data decryption, key derivation, and password derivation. The cryptography manager 74 does not access the keystore 84 or the file system, it only handles the cryptographic operations with the parameters that are given.

The user's keystore 84 contains all keys needed for encrypting and decrypting protected files. Each user has its own keystore and each keystore is encrypted with a different key. Each user's keystore 84 contains shared master keys and also user's master keys. A master key is a symmetric key used for generating the keys that will encrypt the protected files. When a master key is compromised a new version of it is generated to re-encrypt the protected files. The user's keystore 84 may store several versions of the same key, e.g. user's master key version 1.0 and 2.0. The content of a shared master key of a given version must be the same for all users of a given group in order to enable them to share a document, while the content of the user's master keys must be different for each user to avoid unauthorized access to user files. The keystore 84 is also encrypted, as the key used for encrypting the keystore 84 is derived from the user's login and password.

Figure 4:
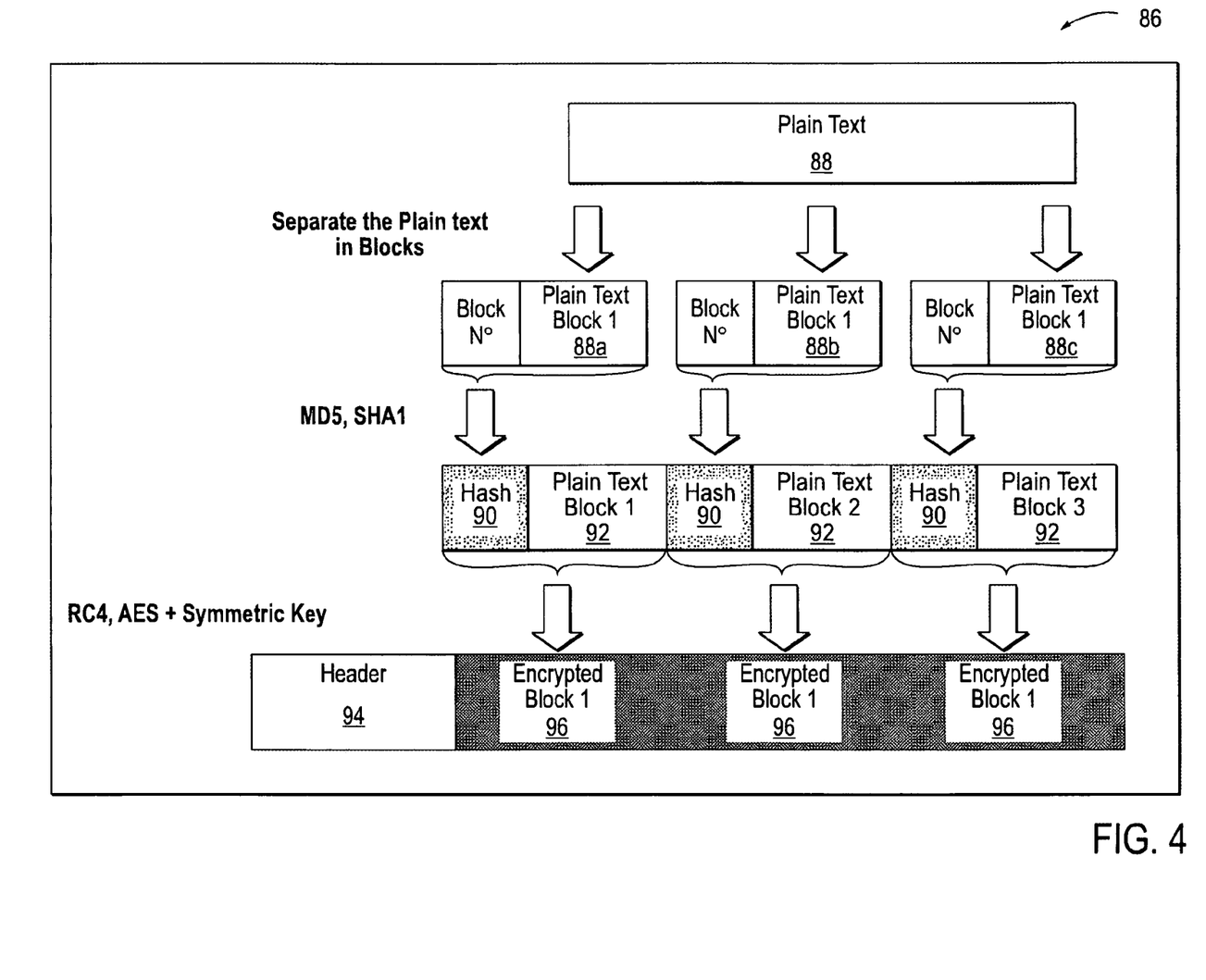
FIG. 4 is a block diagram illustrating a data encryption process of one embodiment.

Data is cryptographically protected by symmetric cryptography for performance reasons, using Blowfish or AES encryption for example. Encryption may be performed as part of various embodiments, including use of the embodiment of FIG. 4 (or portions of the embodiment) in conjunction with the embodiments of FIGS. 1, 2 and 3 for example. FIG. 4 shows a block diagram of how an exemplary encryption is performed. Shown in the system 86, are the plain text 88, hash 90, plain text 92, a header file 94, and the final encrypted data blocks 96. Plain text data 88 is integrity protected by applying a hash algorithm. Subsequently hash 90 and plain text data 88 are symmetrically encrypted (cipher data). For later decryption (or file administration for example), a header file 94 is attached to the cipher data, containing the essential information for decryption. This header file 94 is an XNAL file, which follows the XML encryption standard. Note that header file 94 need not be implemented specifically as an XML file or segment. Rather, it may be implemented as plain text (for performance reasons) or some other format as may be suitable in various systems. The header file 94 may be used for purposes such as data recovery, such as when a user forgets a password or a device proves defective for example.

The same cryptographic mechanism is used for encrypting user and shared files. The only difference between the formats of these files is the symmetric key used for encrypting them. To improve the performance, the plaintext 88 is divided in blocks 88a, 88b, 88c of a fixed size. The last block 88c may be smaller than the defined block size for matching the size of the original plaintext data. Each plaintext block 92 is concatenated with its number and a hash 90 of this concatenation is calculated. This procedure grants integrity of each block.

Confidentiality of the plaintext data 88 is provided by symmetrically encrypting the hash 90 concatenated with the plaintext block 92. The key used for this operation depends on the type of the file as described above. When the file being encrypted is a user file the applied key is the user's master key. For shared files the key used is the shared master key. A header 94 is inserted in the beginning of the file, indicating the parameters used for generating this protected file.

The header manager 76 parses these files and gives all necessary information for the cryptography manager 74. In this exemplary embodiment, it may be an implementation detail only, if a first users' data is synced (synchronized) by a second user as well (a protected management key for instance may be possible to allow such sync) or if each user data is decrypted before sync vs. performing decryption on the WAS server side. Conventional standards for communication channel security such as SSL can be used for the sync transfer and establishment of a confidential communication channel.

Various forms of encryption may be useful for the invention. Preferably, encryption will protect data from unauthorized access without regard to an underlying operating system or hardware system. Moreover, such encryption allows for use of a personal device for a specific application in a specialized area by authorized employees (such as in a warehouse), secure storage of that data in the case of theft or tampering, and transferability of that data when the personal device is in contact with an associated network.

Figure 5:
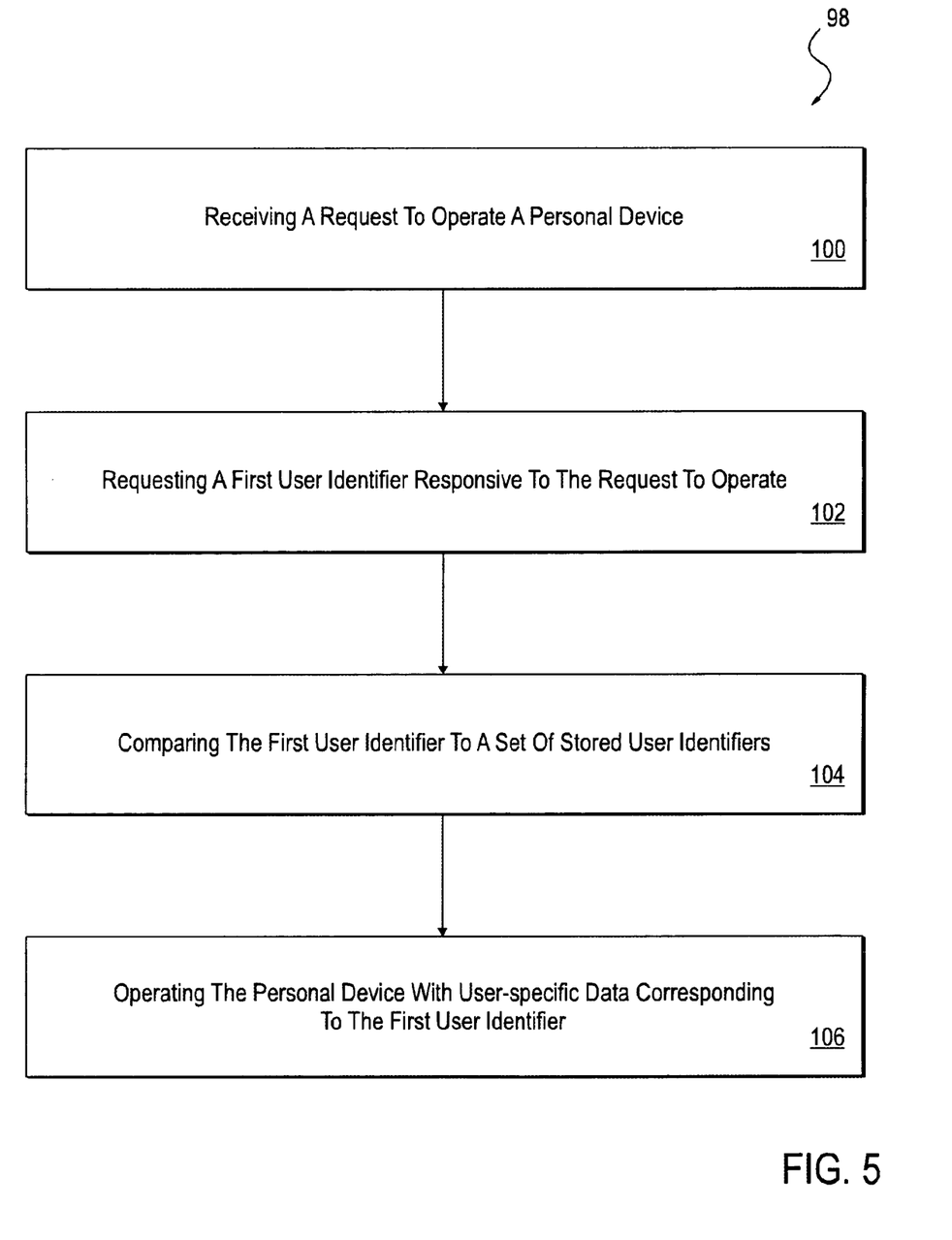
FIG. 5 is a flow diagram illustrating a method of operating the mobile device of one embodiment.
Figure 6:
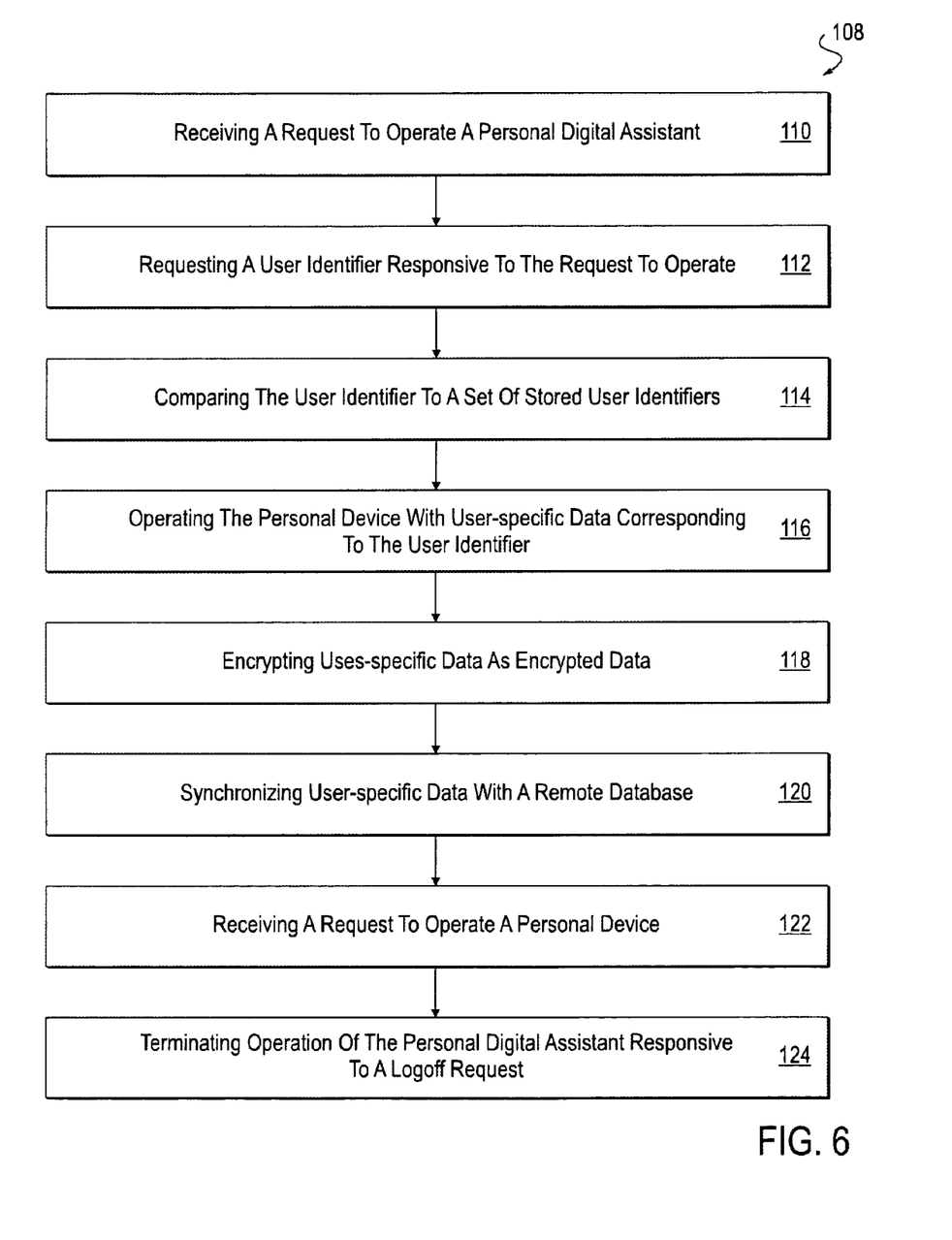
FIG. 6 is another flow diagram illustrating a method of interacting with the mobile device of another embodiment.

FIGS. 5-6 illustrate exemplary methods that allow the user to interact with and encrypt data using the mobile device. Process 98 and other processes may include a set of modules which may be executed in a serial fashion, may be reordered, and may be executed in a parallel fashion. Moreover, the modules of processes 98 and 108 may be implemented as hardware modules operating to provide the functions illustrated, and used in conjunction (individually or collectively) with the embodiments of FIGS. 1-4 for example. FIG. 5 is a flow diagram illustrating an exemplary process 98 enacted or executed by an embodiment of the access controller 72 and cryptography manager 74, to encrypt and store data. Modules of such processes may be implemented as dedicated hardware or embodied in software for example. The methods of FIGS. 5-6 may also be enacted and enabled by the system as described in FIG. 7, either in whole or in part.

FIG. 5 illustrates a process 98 that begins in module 100 by receiving a request to operate a personal device. In module 102 the system requests a first user identifier responsive to the request to operate. In module 104 the first user identifier is compared to a set of stored user identifiers. In module 106 the method proceeds to operate the personal device with user-specific data corresponding to the first user identifier. In this manner the access controller 72 allows only valid users to operate the mobile device. Employing a user's login identification number and password to create the user identifiers is one method of enabling this exemplary embodiment as shown below.

In another exemplary embodiment as shown in FIG. 6, the operator may interact with the mobile device as shown in process 108. The method 108 includes modules enacted by the system to operate a mobile device. The process 108 begins by receiving a request to operate a personal digital assistant in module 110. In module 112 the process continues by requesting a user identifier responsive to the request to operate. In module 114 the mobile system compares the user identifier to a set of stored user identifiers. In module 116 the personal device is operated with user-specific data corresponding to the user identifier. In module 118 the user-specific data is encrypted with a user-specific key. In module 120 the system stores the user-specific data as encrypted data. In module 122 the system synchronizes the user-specific data with a remote database. Finally in module 124 the system terminates operation of the personal digital assistant responsive to a logoff request. In this manner, both the access controller 72 and the cryptography manager 74 work in conjunction with the elements of the system 66 to encrypt and protect stored data as desired. Moreover, one may expect that implementations of these embodiments may occur without implication of specific operating system or hardware system features, thus allowing for device-independent implementation.

Figure 7:
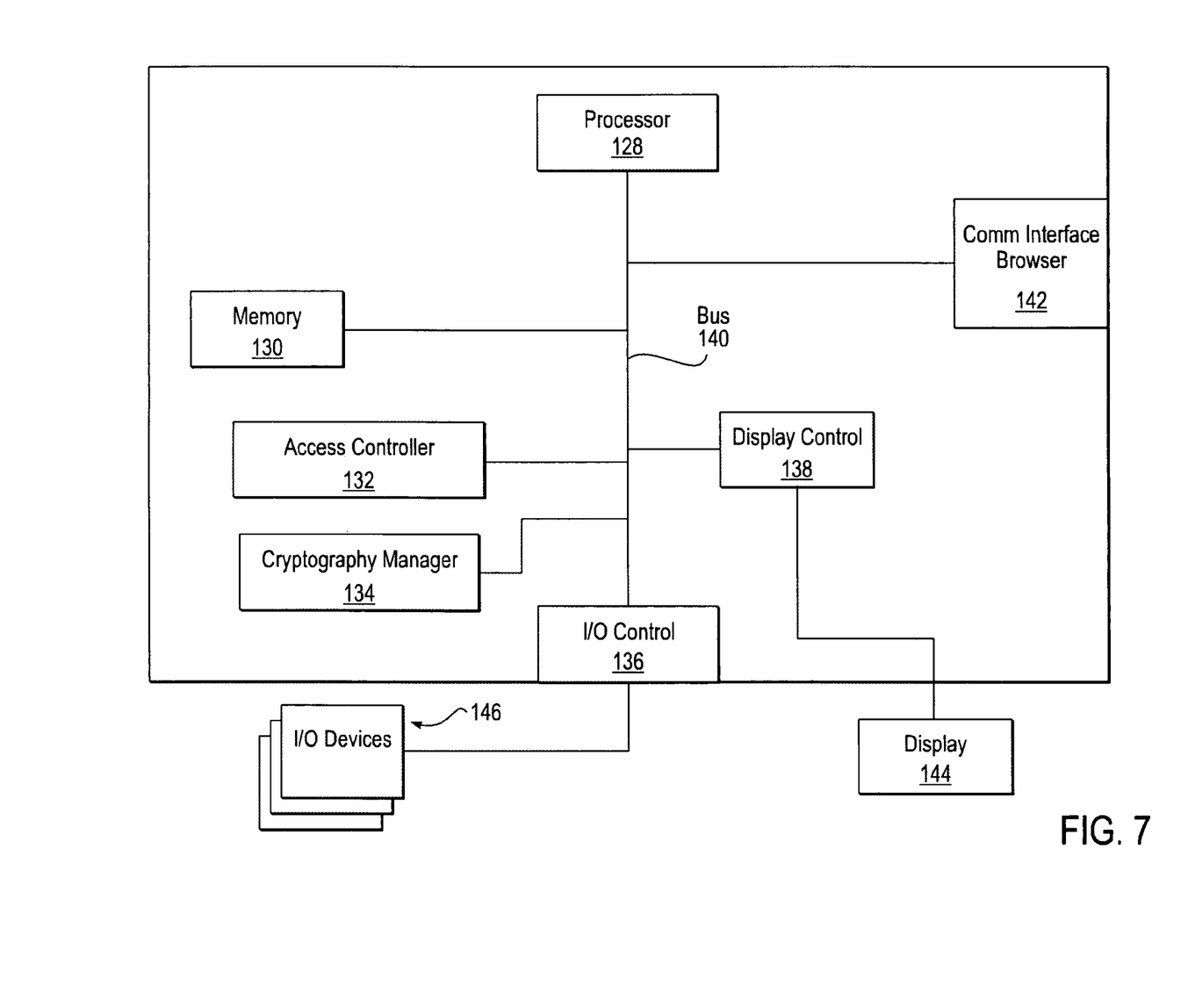
FIG. 7 is a schematic diagram of the mobile device system of another embodiment.

FIG. 7 is a schematic diagram of an embodiment of a mobile device system 126 that can be used to support the system and methods for data encryption as described in FIGS. 1-6 above. The device 126 may interface to external systems through the modem or network interface 142. The modem or network interface 142 can be considered to be part of the computer system 126 and may be integral to the system 126. This interface 142 can be an analog modem, ISDN modem, cable modem, token ring interface, satellite transmission interface (e.g. "Direct PC"), or other interfaces for coupling a mobile device computer system to other computer systems and the public interfaces as shown in FIGS. 1-2.

The exemplary mobile device system 126 includes a processor 128, which can be a conventional microprocessor such as an Intel Pentium microprocessor or Motorola Power PC microprocessor. A memory or file system database 130 stores both the encrypted data and the necessary programs and applications necessary to run the encryption processes. Memory 128 can be dynamic random access memory (DRAM) and can also include static RAM (SRAM). The bus 140 couples the processor 128, the memory 130, the access controller 132, the cryptography manager 134, the display controller 138, and the input/output (I/O) controller 136 for operation. The processor 128 and the access controller 132, the cryptography manager 134, work together to enable and enact the methods of the present system as shown in FIGS. 5-6. The algorithms and processes of the system may be contained in computer programmed code segments as is conventional.

The display controller 138 controls the mobile display device 144 from instructions received from the processor 128 and the memory 130 to provide the appropriate user interfaces for interaction with the mobile system 126. The input/output devices 146 can include a keyboard, disk drives, printers, a scanner, and other input and output devices, including a mouse or other pointing device. The display controller 138 and the I/O controller 136 can be implemented with conventional well-known technology to provide the customized user interface.

The non-volatile storage of data into the database memory 130 is often a magnetic hard disk, an optical disk, or another form of storage for large amounts of data. Some of the encrypted data is often written, by a direct memory access process, into memory 130 during execution of software in the computer system 126. One of skill in the art will immediately recognize that the terms "machine-readable medium" or "computer-readable medium" includes any type of storage device that is accessible by the processor 128 and also encompasses a carrier wave that encodes a data signal.

The exemplary mobile device system 126 is one example of many possible computer systems that have different architectures. For example, personal computers based on an Intel microprocessor often have multiple buses, one of which can be an input/output (I/O) bus for the peripherals and one that directly connects the processor 128 and the memory 130 (often referred to as a memory bus). The buses are connected together through bridge components that perform any necessary translation due to differing bus protocols.

Mobile devices do not usually include a hard disk so the executable programs are loaded from a network connection into the memory 130 for execution by the processor 128. A Web TV system, which is known in the art, is also considered to be a computer system according to this embodiment, but it may lack some of the features shown in FIG. 7, such as certain input or output devices. A typical computer system will usually include at least a processor, memory, and a bus coupling the memory to the processor.

In addition to the algorithms of the present system, the exemplary system 126 is controlled by operating system software that includes a file management system, such as a disk operating system, which is part of the operating system software. One example of an operating system software with its associated file management system software is the family of operating systems known as Windows® from Microsoft Corporation of Redmond, Wash., and their associated file management systems. Another example of an operating system software with its associated file management system software is the LINUX operating system and its associated file management system. The file management system is typically stored in the memory 130 and causes the processor 128 to execute the various acts or modules required by the operating system to input and output data and to store data in memory, including storing files in the memory 130.

Some portions of the detailed description relating to the access controller 132 and the cryptography manager 134, have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments also relate to the apparatus for performing the operations herein. This apparatus may be specially constructed for the required purposes, or it may include a general purpose computer selectively activated or reconfigured by a computer program stored in the computer. Such a computer program may be stored (embodied) in a computer (machine) readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein relating to the access controller 132 and the cryptography manager 134 are not inherently related to any particular computer or other apparatus. Various general purpose systems may be used with programs in accordance with the teachings herein, or it may prove convenient to construct more specialized apparatus to perform methods. In addition, the present invention is not described with reference to any particular programming language, and various embodiments may thus be implemented using a variety of programming languages.

Figure 8:
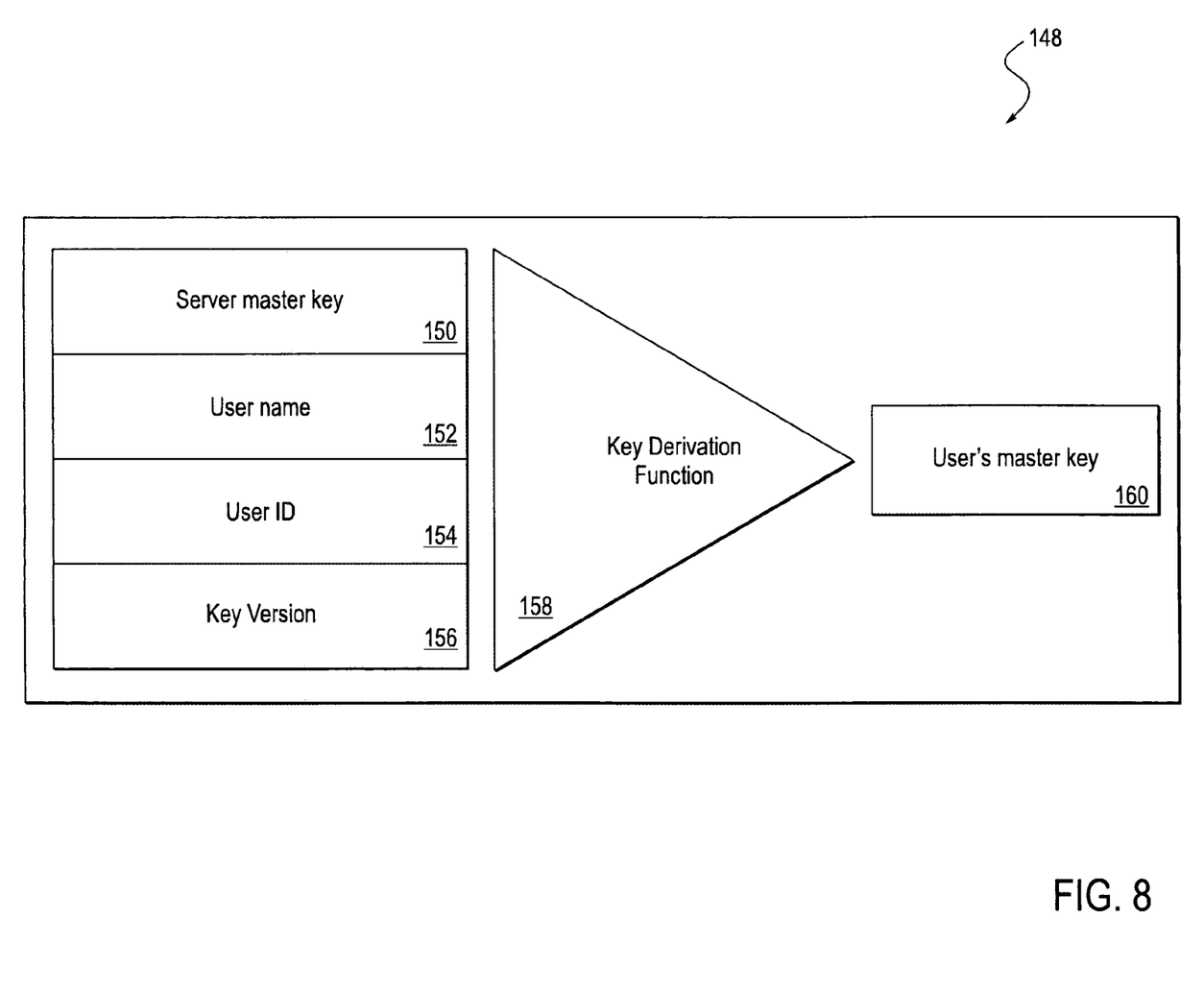
FIG. 8 is a diagram of a user master key of another embodiment.

In another embodiment, a key management mechanism for generating and retrieving a user's master key is provided. The features described in FIG. 8 may be used as parts of various embodiments, either in whole or in part, and thus may be integrated into the systems of FIGS. 1-3 and 7, or used with the methods of FIGS. 4-6 for example. FIG. 8 illustrates a key management mechanism 148 that may work on the server side of a mobile system. A server master key 150, along with the user name 152, user ID 154, and the required version of the key 156, are used as input parameters for a key derivation function (KDF) 158. The KDF 158 uses one way functions to generate the user's master key 160 and to grant the server master key privacy. After generation the user's master key 160 is sent to the client device through synchronization. The mobile framework stores this key on the user's keystore as described above.

Since the server master key can be used to generate the user's master keys, it also should be stored in a secure way on the server, allowing only the system administrator to access it. For such storage, specialized hardware such as smart cards may be used, for example. Another embodiment is also to define, on the server side, which applications should use the Secure Storage architecture. A flag indicating whether the application should use the Secure Storage architecture may be added to the Web Console on the server as shown in FIG. 1. The information of this flag may be sent to the client through synchronization so the server may be automatically updated.

In some embodiments, encryption and cryptographic operations may be performed on the application layer (for example) using key derivation techniques. Such key derivation techniques may allow for server based key management of the user identifier/ID. Thus, the keys of the mobile device may be managed from the server and derived from user IDs or combinations of user IDs and passwords for example. Moreover, such key derivation may also depend on seed data or time-varying constants (such as date/timecodes for example).

Additionally, in some embodiments, key escrow may be implemented. For example, key escrow may effectively allow for password retrieval—such as by using header information. In one embodiment, a scenario where the user forgets a password and the password links to a user key may be remedied by recalculating based on the header associated with encrypted data and key derivation of the server side master key. Thus, a password may be retrieved (or reset) by relying on an independent channel/property of identity verification besides the one(s) used for client side system authentication of a user. For example, a password may be retrieved by verifying identity (of a user) or by authority (of an administrator for example) at a server level in conjunction with header information on the remote/local device in some embodiments. This potentially allows for retrieval of information when a user forgets a password, or when a user refuses to provide a password, for example, thus allowing for information recovery by an entity controlling a personal device when users of the device are unable or unwilling to assist.

Described and illustrated are various embodiments which may be used to implement access control on personal devices. The access control may be implemented at the application level, thereby allowing for encrypted data and individualized use of personal devices independent of operating systems and hardware implementations. Moreover, such personal devices may have encrypted data recovered through use of server-based derivation of encryption keys for example. Additionally, such personal devices may have data which is not easily accessible without proper access, even when such devices are stolen, tampered with, or underlying hardware and operating systems are modified to gain access.

One skilled in the art will appreciate that although specific examples and embodiments of the system and methods have been described for purposes of illustration, various modifications can be made without deviating from the spirit and scope of the present invention. For example, embodiments of the present invention may be applied to many different types of databases, systems and application programs. Moreover, features of one embodiment may be incorporated into other embodiments, even where those features are not described together in a single embodiment within the present document. Accordingly, the invention is described by the appended claims.

What is claimed is:

1. A method comprising:
storing user-specific data for each of multiple users on a mobile personal device, wherein the user-specific data is accessible through a persistence layer on the mobile personal device;
associating the user-specific data for each of the multiple users with a user identifier for each of the multiple users;
storing the user identifier for each of the users on the mobile personal device;
receiving a request from one of the users having a first user identifier to operate an application of the mobile personal device, wherein the request includes access to the user-specific data associated with the first user identifier;
intercepting the request and determining whether to process the request using an access controller;
requesting the first user identifier responsive to the request to operate;
comparing the first user identifier to the stored user identifiers;
granting the request and enabling access to the user-specific data through the persistence layer if the first user identifier matches when compared against the stored user identifiers; and
operating the application of the mobile personal device with the user-specific data corresponding to the first user identifier.

2. A method as recited in claim 1, wherein:
the mobile personal device is a personal digital assistant (PDA).

3. A method as recited in claim 2, wherein:
the user identifier is a user ID number and password.

4. A method as recited in claim 2, wherein:
the user identifier is a user specific key.

5. A method as recited in claim 3, further comprising:
storing user-specific data as encrypted data.

6. A method as recited in claim 5, further comprising:
encrypting data with the user-specific key.

7. A method as recited in claim 6, further comprising:
synchronizing data with a sewer.

8. A method as recited in claim 6, further comprising:
storing a header file with the encrypted data.

9. A method as recited in claim 6, further comprising:
requesting a second user identifier; and
wherein encrypting data occurs using symmetric encryption methods.

10. A method as recited in claim 1, wherein:
the method is performed by a processor responsive to execution of a set of instructions, the set of instructions embodied in a storage device.

11. An apparatus, comprising:
a remote mobile personal device including:
an operating system;
an access controller that is configured to receive requests for access to user-specific data stored on the remote mobile personal device for each of multiple users and that is configured to control access to the user-specific data using one or more keys associated with the multiple users and stored on the remote mobile personal device, wherein the user-specific data is accessible through a persistence layer on the remote mobile personal device;
a cryptography manager that is configured to encrypt and decrypt the user-specific data in response to requests from the access controller using the one or more keys; and
an application coupled to the access controller and the cryptography manager, the application to query the access controller for an indication of permission to execute including accessing the user-specific data through the persistence layer.

12. An apparatus as recited in claim 11, further comprising:
a processor.

13. An apparatus as recited in claim 12, further comprising:
a file system manager.

14. An apparatus as recited in claim 13, further comprising:
a user interface; and
a network interface.

15. An apparatus as recited in claim 13, further comprising:
means for interacting with a user.

16. An apparatus as recited in claim 14, further comprising:
a network server.

17. A method, comprising:
storing user-specific data for each of multiple users on a mobile personal device, wherein the user-specific data is accessible through a persistence layer on the mobile personal device;
associating the user-specific data for each of the multiple users with a user identifier for each of the multiple users;
storing the user identifier for each of the users on the mobile personal device;
receiving a request from one of the users having a first user identifier to operate an application of the mobile personal device, wherein the request includes access to the user-specific data associated with the first user identifier;
intercepting the request and determining whether to process the request using an access controller;
requesting the first user identifier responsive to the request to operate;
verifying the first user identifier against the stored user identifiers;
granting the request and enabling access to the user-specific data through the persistence layer;
operating the application of the mobile personal device with the user-specific data corresponding to the user identifier;
encrypting the user-specific data with a user-specific key within the application;
storing the user-specific data as encrypted data;
synchronizing the user-specific data with a remote database; and
terminating operation of the mobile personal device responsive to a logoff request.

18. A method as recited in claim 17, wherein:
the first user identifier is a user ID and the encrypting is performed in an application layer using key derivation techniques based on the user ID.

19. A method as recited in claim 18, wherein:
the encryption is performed using symmetric encryption methods.

20. A method as recited in claim 19, further comprising:
deriving the user specific key at a server based on the user ID in conjunction with a key management component.

* * * * *

UNITED STATES PATENT AND TRADEMARK OFFICE
CERTIFICATE OF CORRECTION

PATENT NO. : 7,587,608 B2 Page 1 of 1
APPLICATION NO. : 11/001147
DATED : September 8, 2009
INVENTOR(S) : Haller et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1023 days.

Signed and Sealed this

Twenty-first Day of September, 2010

David J. Kappos
*Director of the United States Patent and Trademark Office*